(12) United States Patent
Rakurty et al.

(10) Patent No.: US 10,940,546 B2
(45) Date of Patent: *Mar. 9, 2021

(54) GROUND SET HOLE SAW

(71) Applicant: The M.K. Morse Company, Canton, OH (US)

(72) Inventors: Chandra Sekhar Rakurty, North Canton, OH (US); Peter Christopher Vandervaart, North Canton, OH (US)

(73) Assignee: The M.K. Morse Company, Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,264

(22) Filed: Aug. 20, 2019

(65) Prior Publication Data

US 2019/0375034 A1 Dec. 12, 2019

Related U.S. Application Data

(63) Continuation-in-part of application No. 15/834,585, filed on Dec. 7, 2017, and a continuation-in-part of application No. 15/684,060, filed on Aug. 23, 2017, now Pat. No. 10,384,273, said application No. 15/834,585 is a continuation of application No.
(Continued)

(51) Int. Cl.
  *B23B 51/04* (2006.01)
  *B23D 65/00* (2006.01)
  *B23D 61/12* (2006.01)

(52) U.S. Cl.
  CPC ...... *B23B 51/0406* (2013.01); *B23B 2251/28* (2013.01); *B23B 2251/285* (2013.01); *B23B 2251/428* (2013.01); *B23D 61/121* (2013.01); *B23D 65/00* (2013.01)

(58) Field of Classification Search
  CPC ............ B23B 2251/14; B23B 2251/28; B23B 51/0406; B23B 51/05; B23B 51/04; B23D 61/021; B23D 61/121; B23D 61/00; B23D 61/12; B23D 61/122; B23D 61/123; B23D 61/125; B23D 61/126; B23D 61/025; Y10T 408/895; Y10T 408/8957; Y10T 408/896

See application file for complete search history.

(56) References Cited

U.S. PATENT DOCUMENTS 1,005,261 A   7/1870  Shailer
2,473,077 A   6/1949  Starbuck
(Continued)

FOREIGN PATENT DOCUMENTS

GB       2353744 A     3/2001

*Primary Examiner* — Nicole N Ramos
(74) *Attorney, Agent, or Firm* — Black, McCuskey, Souers & Arbaugh LPA

(57) ABSTRACT

A hole saw with a substantially cylindrical body, a center axis of rotation, an inner surface, and an outer surface. A cutting edge defined by a plurality of ground set teeth arranged in a pattern includes a first group of teeth oriented at angles toward the center axis of rotation intermixed with a second group of teeth oriented at an angle away from the center axis of rotation. The teeth angled away from the center axis of rotation are oriented at substantially the same angle and the teeth angled toward the center axis of rotation are oriented with each progressive tooth of the first group have an increasing angle relative to a prior tooth of the first group.

12 Claims, 6 Drawing Sheets

Related U.S. Application Data

15/132,305, filed on Apr. 19, 2016, now Pat. No. 10,279,408.

(60) Provisional application No. 62/378,756, filed on Aug. 24, 2016.

(56) References Cited

U.S. PATENT DOCUMENTS

| | | | |
|---|---|---|---|
| 2,635,327 A | 4/1953 | Enlow | |
| 2,779,361 A | 1/1957 | McKiff | |
| 2,849,037 A | 8/1958 | Wright | |
| 3,110,952 A | 11/1963 | Anderson | |
| 3,292,674 A | 12/1966 | Turner | |
| 3,736,828 A | 6/1973 | Funakubo | |
| 3,973,455 A | 8/1976 | Slaats et al. | |
| 4,179,967 A | 12/1979 | Clark | |
| 4,212,568 A | 7/1980 | Minicozzi | |
| RE31,433 E | 11/1983 | Clark | |
| 4,423,553 A | 1/1984 | Miyawaki | |
| 4,721,421 A | 1/1988 | Klinger | |
| 5,331,876 A | 7/1994 | Hayden, Sr. | |
| 5,451,128 A | 9/1995 | Hattersley | |
| 5,803,678 A * | 9/1998 | Korb | B23B 51/0426 408/206 |
| 6,158,324 A | 12/2000 | Kullmann et al. | |
| 6,257,226 B1 | 7/2001 | Hayden, Sr. | |
| 6,269,722 B1 * | 8/2001 | Hellbergh | B23D 61/121 83/661 |
| 6,520,722 B2 | 2/2003 | Hopper et al. | |
| 6,598,509 B2 | 7/2003 | Cook et al. | |
| 6,786,684 B1 | 9/2004 | Ecker | |
| 7,121,180 B2 | 10/2006 | Shimofurutani | |
| 7,237,291 B2 | 7/2007 | Redford | |
| 7,658,576 B1 | 2/2010 | Buzdum et al. | |
| 7,661,347 B2 | 2/2010 | Nagano et al. | |
| 8,052,356 B2 | 11/2011 | Singh | |
| 8,579,554 B2 | 11/2013 | Novak et al. | |
| 8,579,555 B2 | 11/2013 | Novak et al. | |
| 9,038,512 B2 | 5/2015 | Horiguchi et al. | |
| 9,162,299 B2 | 10/2015 | Kullmann et al. | |
| 9,248,518 B2 | 2/2016 | Elliston et al. | |
| 9,751,134 B2 * | 9/2017 | Thom | B23B 51/0406 |
| 10,384,273 B2 * | 8/2019 | Rakurty | B23D 63/201 |
| 2003/0010177 A1 | 1/2003 | Cook et al. | |
| 2005/0257660 A1 * | 11/2005 | Hayden | B23D 61/121 83/846 |
| 2009/0035082 A1 | 2/2009 | Singh | |
| 2012/0090443 A1 * | 4/2012 | Butzen | B23D 61/121 83/849 |
| 2012/0230788 A1 * | 9/2012 | Bozic | B23D 61/121 408/209 |
| 2012/0279372 A1 * | 11/2012 | Kullmann | B23D 61/121 83/846 |
| 2013/0133500 A1 | 5/2013 | Horiguchi et al. | |

* cited by examiner

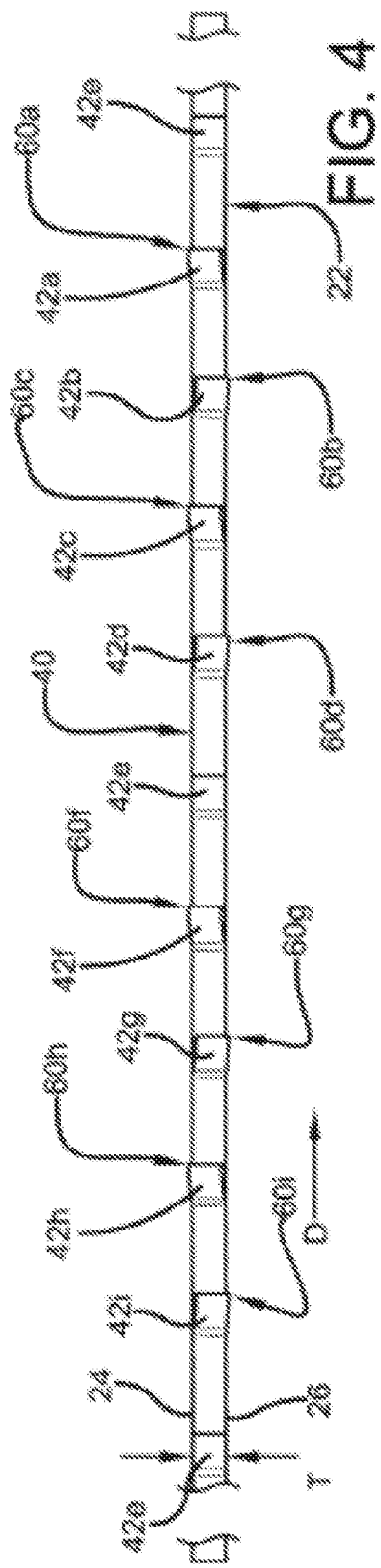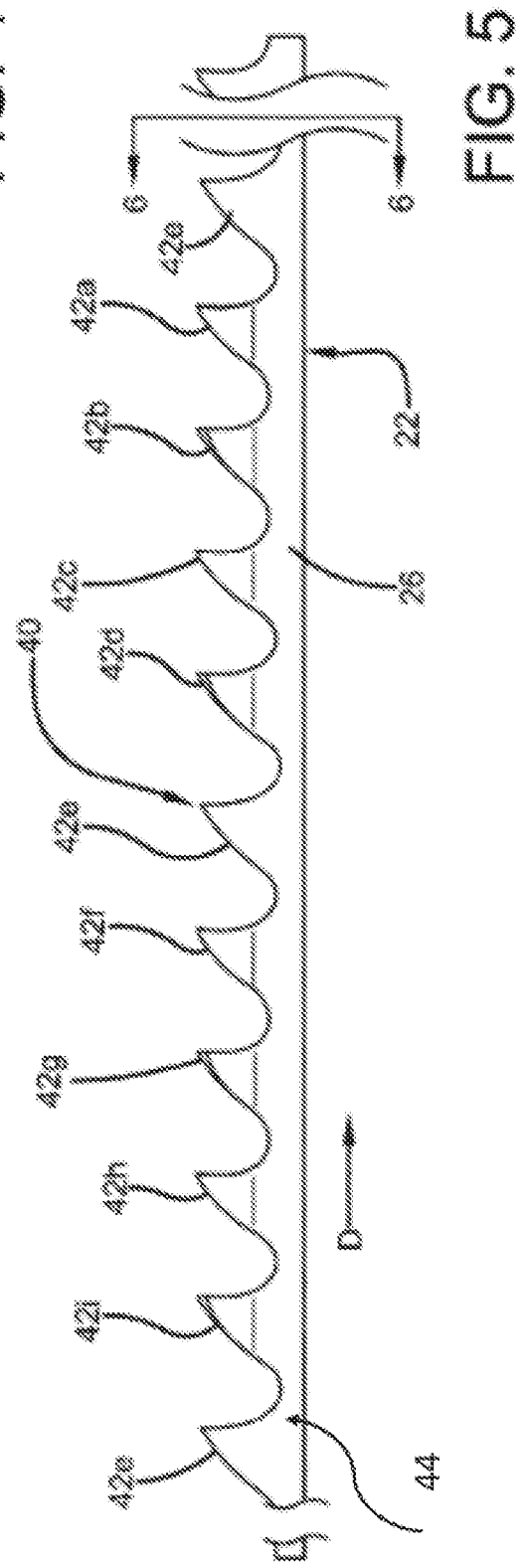

GROUND SET HOLE SAW

CROSS-REFERENCE TO RELATED APPLICATIONS

This application is a Continuation-In-Part of and claims priority to and the benefit of both U.S. patent application Ser. No. 15/684,060, filed Aug. 23, 2017, which claims priority to and the benefit of U.S. Provisional Patent Application No. 62/378,756, filed Aug. 24, 2016, and U.S. patent application Ser. No. 15/834,565, filed Dec. 7, 2017, which is a Continuation of and claims priority to and the benefit of U.S. patent application Ser. No. 15/132,305, filed Apr. 19, 2016, the contents of all of which are hereby incorporated by reference in their entirety.

BACKGROUND

This relates in general to hole saws. A hole saw is a type of cutting tool or implement used in forming circular holes in various materials, such as wood, metal, drywall, etc. The hole saw typically has a hollow and substantially cylindrical body. The cylindrical body has a pair of concentric side walls and a center axis of rotation. A cutting edge with a blade backer and teeth is located at one end of the cylindrical body. A cap is typically located at the end of the body opposite the cutting edge. The cap may include threads, holes or other structure adapted to allow the hole saw to be drivingly connected to a drill, such as through an arbor or driver.

Teeth of the cutting edge are designed to cut a work piece during rotation of the cutting tool. In use, the circular cutting edge creates a circular hole in a work piece and, in turn, removes a cylindrical slug from the work piece. The teeth may all be contained within cylinders extending from the pair of concentric side walls or have some or all of the teeth extending inwardly, toward the center axis of rotation, the same distance and/or outwardly the same or different distances. Every inwardly extending tooth and the inner side wall can contact and hold the slug in the hole saw and can require a relatively large application of force to remove the slug. Typically, after the hole is cut in the work piece, the slug is retained within the hollow interior of the hole cutter and must be removed prior to cutting another hole. The slug removal process is often difficult and time consuming.

Standard hole saws may include apertures or slots formed in the side walls of the hole saw body to pry against in order to force the slug from within the hole saw. A slug may still be difficult to extract from within the body of the hole saw even if it is equipped with slug removal apertures or slots. This is because the slug can become tightly wedged in the hole saw due to moisture, chips, removed and displaced material from the cut or other debris that can find their way between the inner side wall of the hole saw and the slug. The teeth that extend inwardly the same distance, if so equipped, may further exacerbate retention of the slug within the hole saw by engaging the outer surface of the slug.

In addition to slug removal, there are several other characteristics for a hole saw blade that manufacturers attempt to control. A variety of approaches are used to achieve the desired hold saw blade characteristics. The approaches include selecting the materials used to manufacture the blade and designing the profiles of the hold saw blade teeth. For example, manufactures may incorporate relatively hard materials, such as carbide, bi-metal, cermet, ceramic, diamond, or the like, into the tips of the hole saw blade teeth. Because such hard materials are relatively expensive, incorporating the material only into the blade tip allows manufactures to achieve the desired characteristics of the hole saw blade, while minimizing cost of blade production.

In order to incorporate the selected hard material into the tooth tip, a pellet of the selected hard material is first welded to an apex of each blade tooth. Once the pellet of the selected material is welded to the tooth apex, blade manufactures grind the tooth tip. The welded material on the tooth tip typically has a width that is slightly greater than the width of the tooth and blade. The sides of the tip are typically then ground to a tip width that is essentially the same as width or thickness of the tooth and blade backer.

Blade kerf is the overall width of the cut on a workpiece as the saw blade advances through the workpiece. Generally, it is desirable to have a kerf that is relatively wider than the thickness of the tooth and blade backer while cutting certain materials. In order to increase the kerf width, blade manufacturers transversely or laterally position portions of the teeth, including their tips, to locations outside of the thickness or path of travel of the blade backer by a process known as mechanical setting.

The rake angle is the angle that is formed between the tooth face and a line perpendicular to the cutting direction of the blade. A positive rake angle is less than 90 degrees in relation to that perpendicular line and a negative rake angle is more than 90 degrees in relation to that line. The variation in rake angle is a function of the amount of material to be removed, which is a function of tooth spacing and tooth height. Just like the blade kerf, the rake angle is typically mechanically set.

To increase blade kerf and set the rake face angle by mechanical setting, the orientation of the teeth relative to the blade backer are mechanically repositioned by applying a force on either side of each individual tooth. The force plastically deforms the tooth so that the tooth tip is transversely or laterally offset relative to the longitudinal extent of the blade backer or the direction of cutting action travel on the side opposite to the impact. Based on the blade characteristics desired, the individual teeth can be offset to the either side of the blade backer, toward the center axis of rotation or away from the center axis of rotation, with a repeating and/or alternating pattern.

It is desirable to try to control the overall tooth offset of a given blade to ensure that the kerf is precise and uniform over the entire length of the blade. While mechanical setting allows blade manufactures to increase blade kerf, the distance that the teeth are offset from the blade backer as a result of the impact force may not be as controlled as may be desired for a quality cut finish and for even wear of the teeth. There are also physical and manufacturing limits as to how far the teeth can be offset. Furthermore, mechanically setting the blade teeth adds an additional processes step to the manufacturing process, which in turn increases blade manufacturing costs, production scheduling and lead time.

Thus, there is a need for a hole saw blade that overcomes the disadvantages associated with slug removal from previously known hole saws along with the limitations and disadvantages of mechanically setting the blade teeth. The hole saw according to the disclosed subject matter satisfies this need and overcomes the disadvantages, drawbacks and limitations of previously known hole saws.

SUMMARY

This relates more particularly to a hole saw with an improved cutting edge. An improved hole saw cutting edge, according to an aspect of the disclosed subject matter, addresses slug formation and removal as well as setting of the blade teeth. The improved hole saw uses relatively fewer teeth extending inwardly than are present on previously known hole saws to form a slug. With relatively fewer inwardly extending teeth that engage and hold the slug within the hole saw, the slug may be extracted with relatively less effort than with previously known hole saws. Additionally, the teeth are ground set to simplify the setting process and expand the range of including harder materials. Controlled, consistent and precision ground setting individual teeth in the hole saw blade eliminates the need to mechanically set the teeth, thereby eliminating a step in the blade manufacturing process and decreasing associated manufacturing costs. Thus, the improved hole saw provides relatively easier removal of a slug from within the hole saw while yielding a controlled, consistent and precise blade kerf and rake angle.

The hole saw includes a substantially cylindrical body with a center axis of rotation and a pair of sides extending generally concentric to each other. The sides define an inner surface and an outer surface of the body of the hole saw. A cutting edge extends from an end of the body. A blade backer and a plurality of teeth forms the cutting edge. The teeth are arranged in a repeating and alternating or raker set pattern with a progressively increasing inside set. Oriented toward the center axis of rotation, intermixed with outside set teeth, oriented away from the center axis of rotation. The plurality of teeth may include a first tooth that extends a first inner distance inwardly, toward the center axis of rotation, of a cylinder containing the inner surface of the body. A second tooth is located adjacent to the first tooth and extends a second outer distance, away from the center axis of rotation, outwardly of a cylinder containing the outer surface of the body. A third tooth is located adjacent the second tooth opposite the first tooth and extends a third inner distance, toward the center axis of rotation, inwardly of the cylinder containing the inner surface. The third inner distance is greater than the first inner distance.

The hole saw may further include a fourth tooth that is located adjacent the third tooth on an opposite side from the second tooth and that extends a fourth outer distance outwardly, away from the center axis of rotation, of the cylinder containing the outer surface. The fourth outer distance is substantially equal to the second outer distance. The hole saw may further include another tooth located on a side of the fourth tooth opposite the third tooth and that extends a fifth inner distance inwardly of the cylinder containing the inner surface. The fifth inner distance is greater than the third inner distance.

The hole saw also may include another tooth located on a side of the fifth tooth opposite the fourth tooth and that extends a sixth outer distance, away from the center axis of rotation, outwardly of a cylinder containing the outer surface. The sixth outer distance is substantially equal to the second and fourth outer distances. The hole saw may yet include another tooth located on a side of the sixth tooth opposite the fifth tooth and that extends a seventh inner distance inwardly of a cylinder containing the inner surface. The seventh inner distance greater than the fifth inner distance. The cutting edge may also have at least one straight tooth that is substantially encompassed between the cylinders extending from the inner and outer surfaces, parallel to the blade backer. The straight tooth or teeth may be located anywhere along the cutting edge.

The plurality of teeth of the above-mentioned hole saw may include tips formed at an apex portion. The plurality includes a mix of asymmetrically and symmetrically ground teeth. The rake face angle may vary among the plurality of teeth.

The hole saw may also include at least one opening extending through the sides of the body. The at least one opening is located and adapted to receive means to force a cut slug in a direction towards the cutting edge. The hole saw may further include a second opening extending through the sides of the body and axially spaced from the at least one opening. The second opening is located and adapted to receive means to force a cut slug in a direction towards the cutting edge.

Various aspects will become apparent to those skilled in the art from the following detailed description and the accompanying drawings.

BRIEF DESCRIPTION OF THE DRAWINGS

At least one exemplary aspect of the disclosed subject matter is illustrated and described. The disclosed subject matter applies to non-limiting concepts and are set forth in the description and illustrated in the drawings in which similar reference numbers throughout the drawings refer to similar components and concepts, wherein:

FIG. 4 is a top view of a portion of the hole saw of FIG. 3 illustrating the plurality of teeth.

FIG. 5 is a side view of the plurality of teeth of FIG. 4.

DETAILED DESCRIPTION

An improved hole saw, according to an aspect of the disclosed subject matter, is used for forming circular holes in various materials, such as metal, wood, composite, plastic, etc. The improved hole saw has a cutting edge with a plurality of teeth that forms and creates a slug with relatively fewer inwardly extending teeth than exist on previously known hole saws. With fewer inwardly extending teeth that engage and hold the slug within the hole saw, the slug may be extracted with relatively less effort than with previously known hole saws. The cutting edge has some inwardly extending teeth of varied and progressively increasing set distances that are spaced apart in a repeating pattern. The teeth are ground set to include harder materials while yielding a controlled, consistent kerf and blade life.

Figure 1:
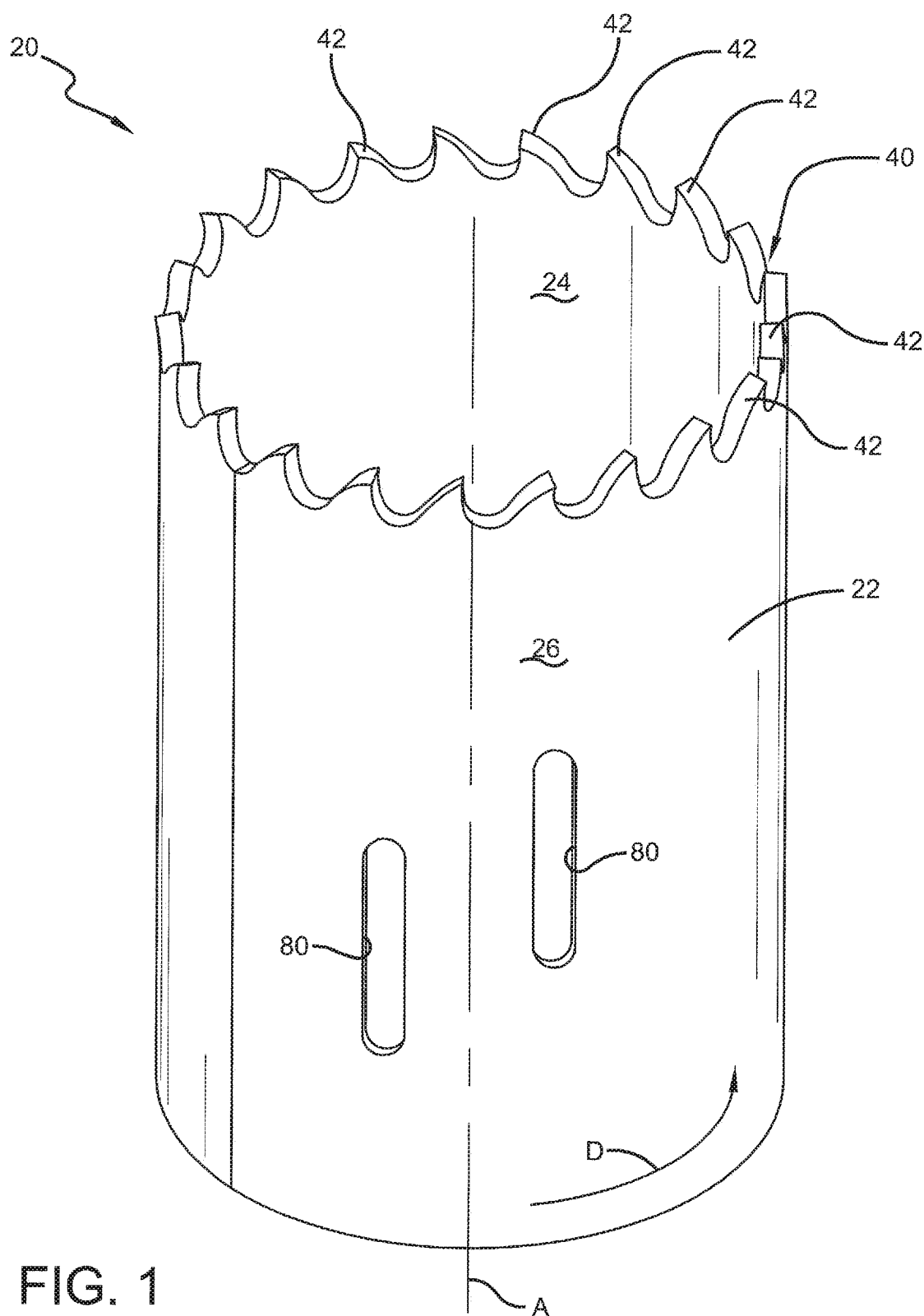
FIG. 1 is a perspective view of a hole saw with a plurality of teeth.

Referring now to the drawings, an exemplary hole saw 20 (FIGS. 1 and 2), according to one aspect, has structure for forming a slug (not shown) that allows relatively easy removal of the slug from the hole saw. The hole saw 20 is designed to cut a workpiece during rotation of the hole saw in the cut direction D. In use, the hole saw 20 creates a circular hole in the workpiece and, in turn, creates a cylindrical slug from the work piece with an outer diameter slightly smaller than the inner diameter of the hole saw. Often, after the hole is cut in the workpiece, the slug is retained within the hole saw 20 and must be removed prior to cutting another hole.

Figure 2:
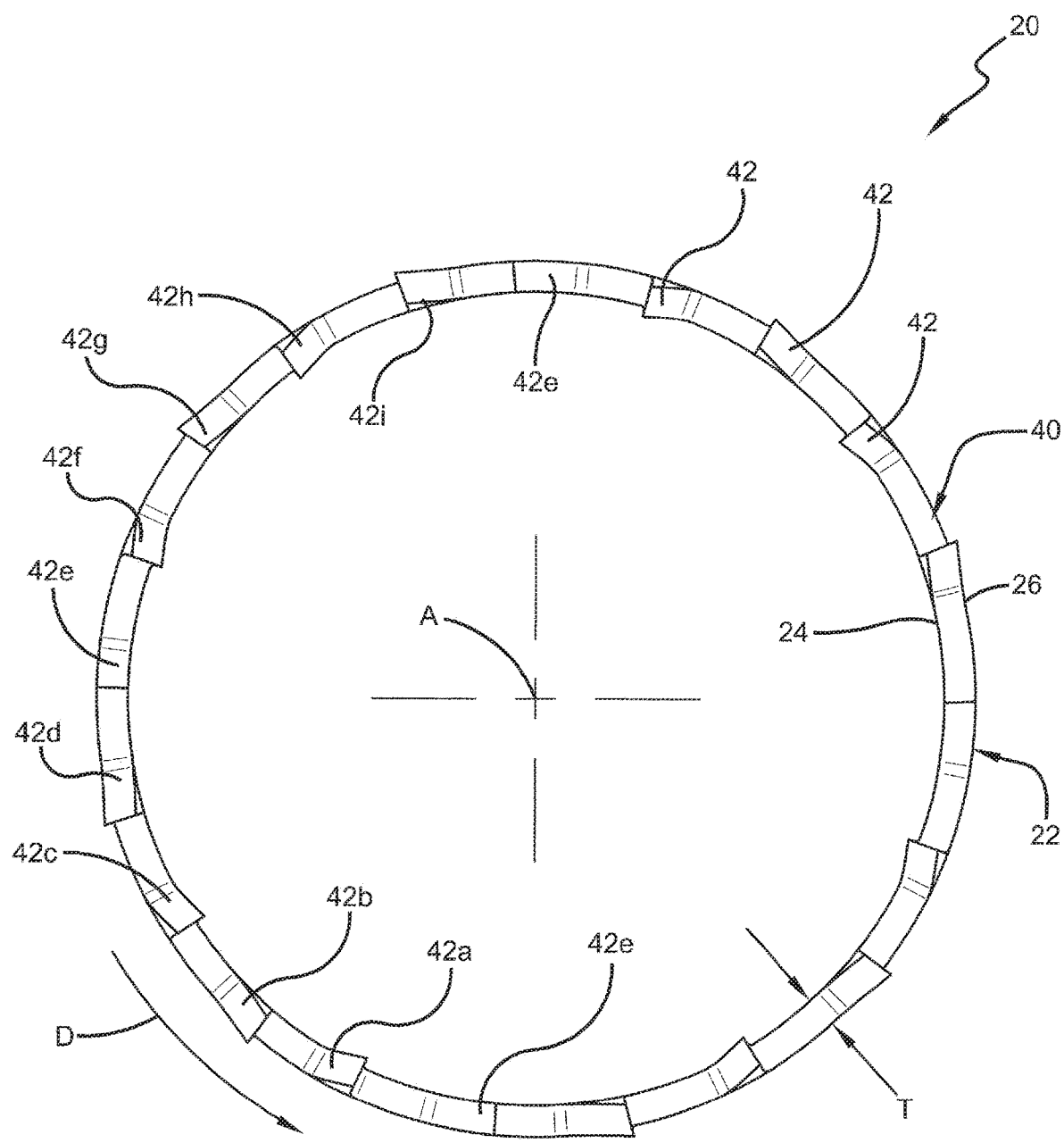
FIG. 2 is a top view of the hole saw of FIG. 1 illustrating the plurality of teeth.

The hole saw 20 has a substantially cylindrical body 22 with a hollow interior and a center axis of rotation, labeled A in FIG. 2. The body 22 has a pair of cylindrical sides 24, 26 extending substantially concentric to each other. The side 24 defines an inner surface of the body 22 of the hole saw 20. The side 26 defines an outer surface of the body 22 of the hole saw 20. The body 22 is made from any suitable metal material, such as steel.

A cutting edge 40 extends from one end of the body 22. The cutting edge 40 forms a substantially annular area in the workpiece by removing material. Residual material inside the annular area forms the cylindrical slug. The inner and outer diameters of the cutting edge 40 may be of any suitable diameters. The hole saw 20 is often offered in a variety of different diameters to accommodate specific uses.

A metal cap (not shown) is typically located at the end of the body opposite the cutting edge 40. The cap would normally be fixed to the body 22 of the hole saw 20 by suitable means, such as welding. In some variations of the hole saw 20, the cap may be integrally formed with the body 22. The cap typically includes threads, holes or other structure adapted to allow the hole saw 20 to be drivingly connected to a power tool, for example a drill, through an arbor. It should be apparent that any suitable material may be used for the cap, such as steel. The hole saw 20 may include a pilot drill bit (not shown) and an arbor or driver attached to the cap, in a known manner.

The cutting edge 40 is defined by a blade backer 44 on the upper portion of body 22 and a plurality of teeth 42 arranged in a repeating and alternating raker set pattern with a progressively increasing inside set. By way of example, for a hole saw 20 that is intended to form a 1.5 inch or 2.0 inches diameter hole in materials, such as metal, wood, composite, plastic, etc., each of the teeth 42 has a tooth height H1 (FIG. 3) of about 0.13 inch. The pitch spacing for the teeth 42 can vary between five and six teeth per inch. The thickness T (FIG. 2) of the body 22 of the hole saw 20 is in the range of 0.045 inch to 0.055 inch, and preferably about 0.050 inch. A height H2 of the body 22 from its bottom as viewed in the FIG. 3 to the root of a tooth 42 is approximately 1.955 inch. The configuration of the teeth 42 of the cutting edge 40 may be altered depending on the material to be cut.

Figure 2A:
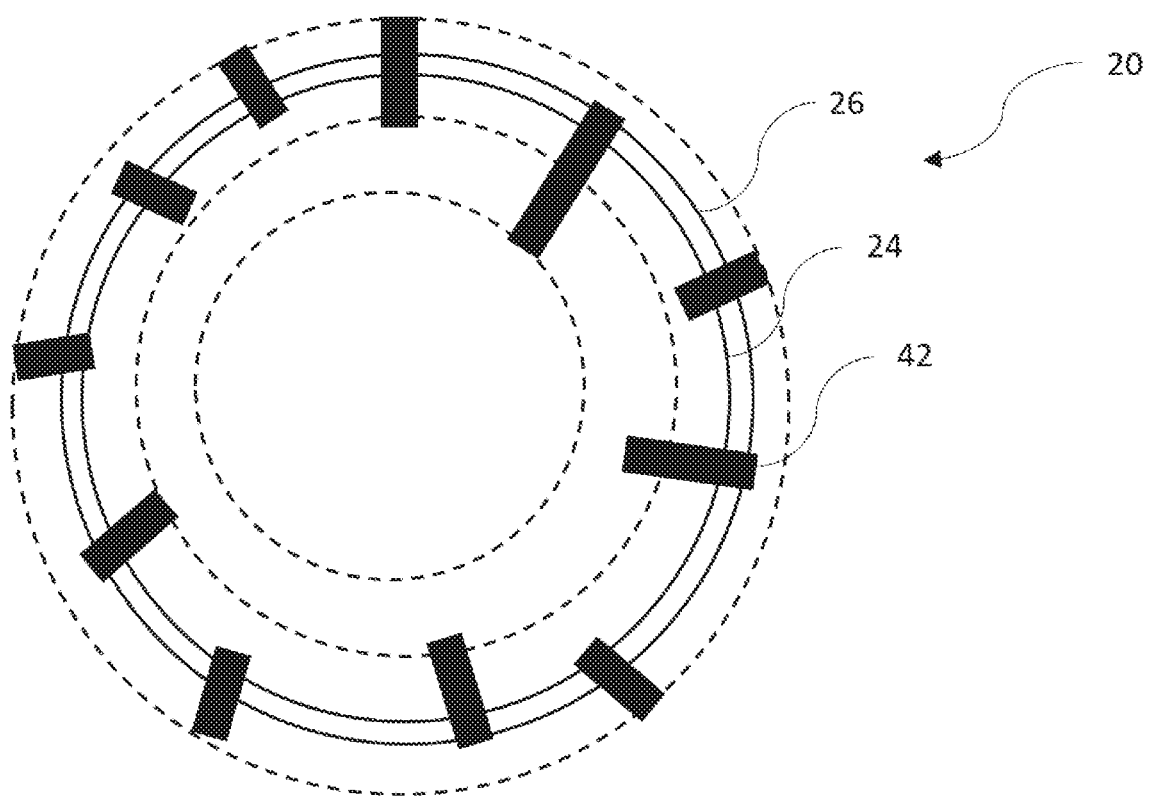
FIG. 2a is a schematic of the cutting path of the plurality of teeth of FIG. 2

The schematic of FIG. 2a illustrates the cutting path of each tooth. The solid lines illustrate the body 22 with cylindrical sides 24 and 26. The dotted lines illustrate the cut path and kerf of each tooth. The kerf of each is based upon the direction that the tooth is ground set. Teeth that are asymmetrically ground toward the center axis of rotation yield a smaller slug than symmetrically ground teeth or teeth asymmetrically ground away from the center axis of rotation.

Figure 3:
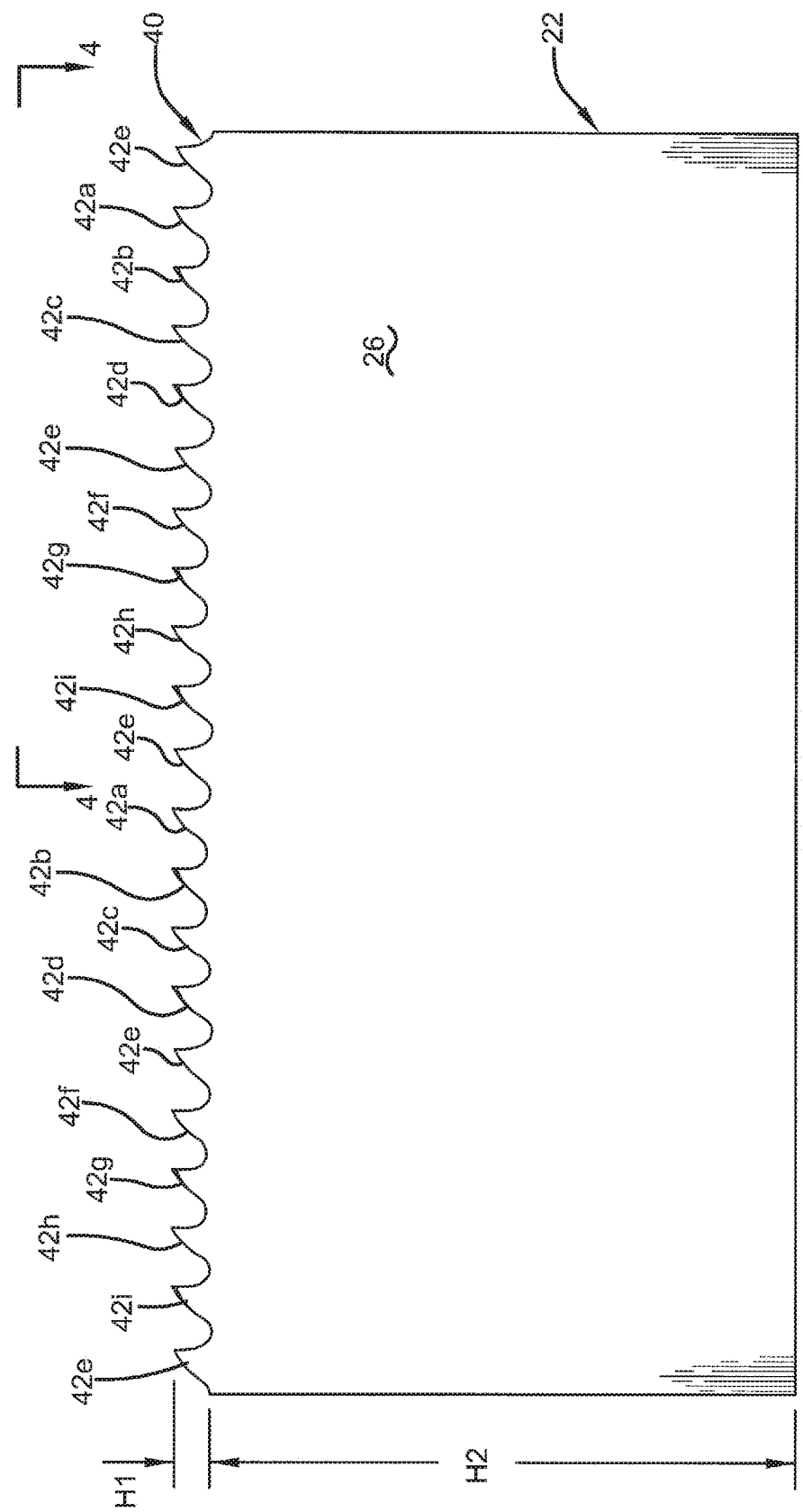
FIG. 3 is a side view of a portion of the hole saw of FIG. 1 illustrating the plurality of teeth
Figure 6:
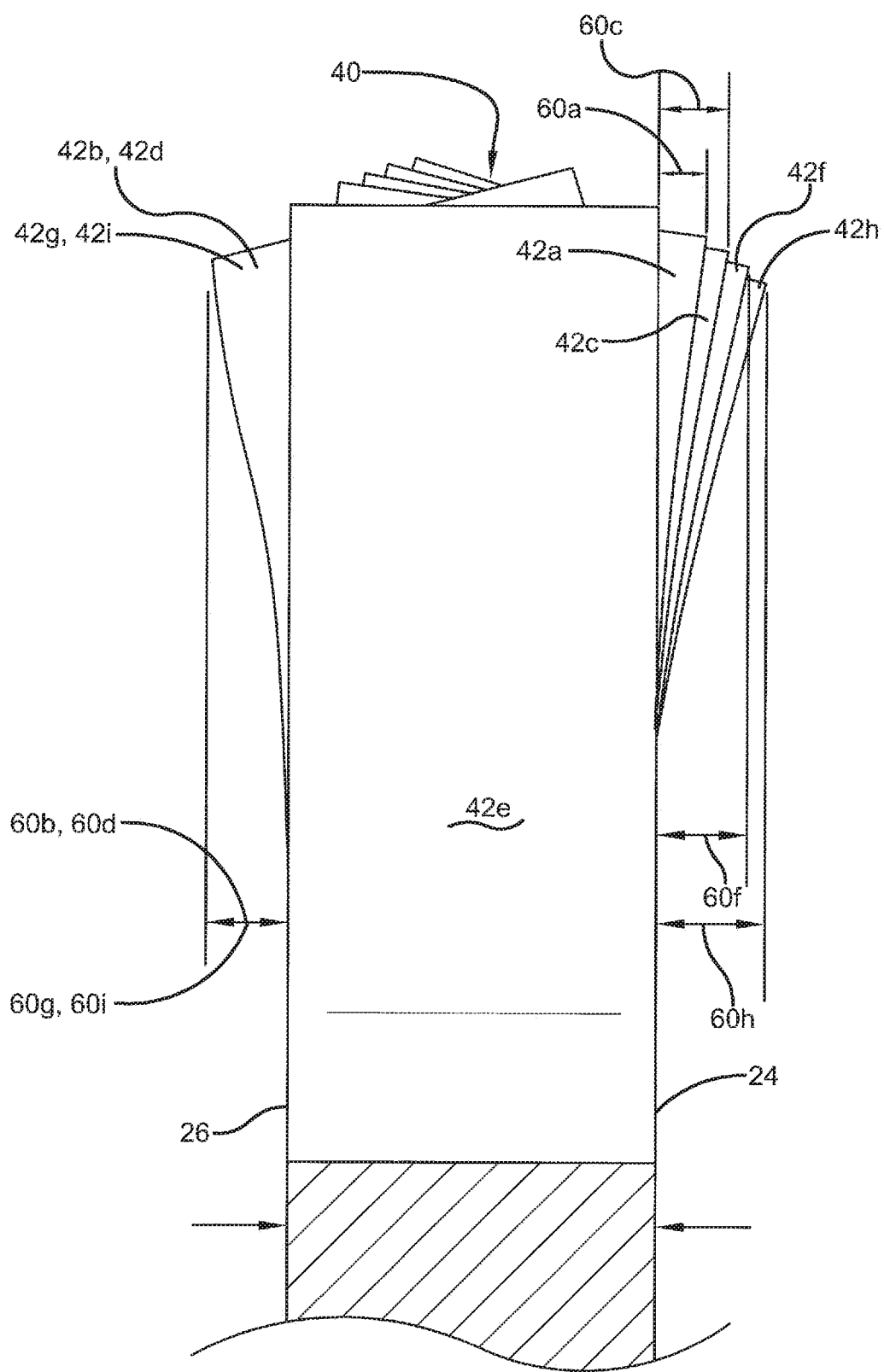
FIG. 6 is a cross-sectional view of the portion of the hole saw of FIG. 4 illustrating the plurality of teeth.

A side view of a portion of the hole saw 20 is illustrated in FIG. 3 that is used to form the body 22 of the hole saw 20. Features of the hole saw 20 will be described for ease of understanding. The description equally applies to the body 22 and both will be referred to interchangeably for the purposes of the disclosed subject matter. The teeth 42 are ground set and arranged in an alternating and repeating raker set pattern of inwardly set teeth, outwardly set teeth, and straight or non-set teeth around the circumference of the cutting edge 40, best seen in FIGS. 2, 4 and 6. The set pattern is established during manufacturing by a ground set process. The set pattern of the teeth 42 is repeated about the circumference of the cutting edge 40 of the hole saw 20. Adjacent teeth 42 may alternate in a repeating pattern among inwardly extending teeth that are asymmetrically ground, straight teeth that are symmetrically ground, and outwardly extending teeth that are asymmetrically ground.

A more controlled, precise and consistent kerf and rake angle of each tooth than those of previously known hole saws is possible with the hole saw blade 20 via the ground set process. This provides a desirably better finish on a cut surface of the workpiece and consistent wear on every tooth 42 of the hole saw 20. The more controlled, precise and consistent kerf and rake angle is established by the construction of the teeth 42 according to one aspect, as will be described below. In addition, other properties and characteristics of the hole saw 20 may be customized.

For example, a first tooth 42a (FIGS. 2-6) in the ground set pattern of teeth 42 of the cutting edge 40 extends for a first inner distance 60a (FIG. 4) inwardly of a cylinder containing the inner surface 24 of the body 22. For exemplary purposes, the first inner distance 60a may be in the range from about 0.005 inch to about 0.010 inch, and preferably about 0.008 inch.

The cutting edge 40 of the hole saw 20 has a second tooth 42b in the ground set pattern that is located adjacent to the first tooth 42a in a direction opposite to the cut direction D. The second tooth 42b extends a second outer distance 60b in an opposite direction that the first tooth 42a extends and outwardly, away from the center axis of rotation, of a cylinder containing the outer surface 26. The second outer distance 60b may be in the range from about 0.010 inch to about 0.030 inch, preferably about 0.022 inch.

The cutting edge 40 of the hole saw 20 also includes a third tooth 42c that is located adjacent the second tooth 42b on an opposite side of the first tooth 42a. The third tooth 42c extends a third inner distance 60c inwardly, toward the center axis of rotation, of the cylinder containing the inner surface 24. The third inner distance 60c is greater than the first inner distance 42a. The third inner distance 60c is about equal to the first inner distance 60a plus an amount in the range of about 25% to about 100% of the first inner distance, and preferably about 50%. By way of example, the third inner distance may be in the range from about 0.010 inch to about 0.014 inch, and preferably 0.012 inch.

The cutting edge 40 of the hole saw 20 may include a fourth tooth 42d that is located adjacent the third tooth 42c on an opposite side of the second tooth 42b. The fourth tooth 42d extends a fourth outer distance 60d outwardly, away from the center axis of rotation, of the cylinder containing the outer surface 26. The fourth outer distance 60d is substantially equal to the second outer distance 60b. That is, the fourth outer distance 60d may be in the range from about 0.010 inch to about 0.030 inch, preferably about 0.022 inch.

The cutting edge 40 of the hole saw 20 may include another or fifth tooth 42e that may be located adjacent the fourth tooth 42d on an opposite side of the third tooth 42c. The fifth tooth 42e is ground so that it is located substantially between the planes or cylinders containing the inner surface 24 and the outer surface 26. That is, the fifth tooth 42e has no offset to either side relative to the body 22. The fifth tooth 42e is referred to as a straight tooth and removes a significant portion of material as the hole saw 20 advances during a hole cutting operation while the offset ground set teeth increase the kerf to allow the body 22 to pass through the cut workpiece easier. There are multiple straight teeth 42e that serve to increase the material removal thereby reducing the time it takes to cut a hole. Any suitable number of straight teeth 42e may be used in any location about the cutting edge 40 of the hole saw 20.

The cutting edge 40 of the hole saw 20 may include another or sixth tooth 42f that may be located adjacent the fifth tooth 42e on an opposite side from the fourth tooth 42d. The sixth tooth 42f may extend a sixth inner distance 60f inwardly, toward the center axis of rotation, of the cylinder containing the inner surface 24. The sixth inner distance 60f is greater than the third inner distance 60c and the first inner distance 60a. The sixth inner distance 60f is about equal to the third inner distance 60c plus an amount in the range from about 25% to about 100% of the first inner distance, and preferably about 50%. The inner distance 60f is in the range from about 0.014 inch about to 0.019 inch, and preferably about 0.016 inch.

The cutting edge 40 of the hole saw 20 may include another or seventh tooth 42g that may be located adjacent the sixth tooth 42f on an opposite side of the fifth tooth 42e. The seventh tooth 42g may extend a seventh outer distance 60g outwardly of the cylinder containing the outer surface 26. The outer distance 60g is substantially equal to the second outer distance 60b and fourth outer distance 60d. That is, the outer distance 60g is in the range from about 0.010 inch to about 0.030 inch, preferably about 0.022 inch.

The cutting edge 40 of the hole saw 20 may also include an eighth tooth 42h that is located adjacent the seventh tooth 42g on an opposite side from the sixth tooth 42f. The eighth tooth 42h may extend an inner eighth distance 60h inwardly of the cylinder containing the inner surface 24. The eighth inner distance 60h is greater than the sixth inner distance 60f, the third inner distance 60c and the first inner distance 60a. The eighth inner distance 60h is about equal to the sixth inner distance 60f plus an amount in the range from about 25% to about 100% of the first inner distance 60f, and preferably about 50%. The eighth inner distance 60h is in the range from about 0.018 inch to about 0.025 inch, preferably about 0.020 inch.

The cutting edge 40 of the hole saw 20 may further include a ninth tooth 42i located adjacent the eighth tooth 42h on an opposite side from the seventh tooth 42g. The ninth tooth 42i may extend an outer distance 60i outwardly of the cylinder containing the outer surface 26. The outer distance 60i is substantially equal to the second outer distance 60b, the fourth outer distance 60d and seventh outer distance 60g. That is, the ninth outer distance 60i is in the range from about 0.010 inch to about 0.030 inch, preferably about 0.022 inch.

The hole saw 20 with this repeating and alternating offset or ground set relationship of the teeth 42 progressively increasing inner distances 60a, 60c, 60f, 60h of the inwardly extending teeth 42a, 42c, 42f, 42h provides improved performance and relatively easy slug removal over previously known hole saws. The inner distances 60a, 60c, 60f, 60h progressively increase in a direction opposite to the cut direction D from a previous inner distance by a factor in the range from about 25% to about 100% of the first inner distance, and preferably 50% of the first inner distance. For example, using the preferred 50% progressive increase and starting with the first inner distance 60a as 0.008 inch, the third inner distance would be 0.012, the sixth inner distance would be 0.016 and the eighth inner distance would be 0.020. The hole saw 20 provides a relatively easier removal of a slug that is located within the body 22 because only every ninth tooth 42h, in the exemplary aspect, contacts and holds the slug in the body 22. Whereas in prior art hole saws having teeth that extend inwardly the same distance, every inwardly extending tooth contacts and holds the slug in the hole saw. Less force is required to eject a slug from the hole saw 20 because there are fewer teeth 42h in holding contact with the slug. The hole saw additionally yields improved kerf control and blade life via the ground set process as opposed to a mechanical set process. Because mechanically setting the saw blade teeth to increase kerf width is generally uncontrollable and causes imprecise and non-uniform blade kerf widths, ground setting provides advantages for certain applications that the hole saw 20 may be used in.

Any suitable number of teeth 42 may be used in any configuration as long as the teeth extending inwardly of the body 22 progressively increase in the distance that they extend from the inner surface 24 of the body. Any suitable number of fifth or straight teeth 42e may be used and in any location, or variety of locations, in the pattern of teeth 42 of the cutting edge 40.

The hole saw 20 may include at least one opening or multiple openings 80 extending through the sides 24, 26 of the body 22. The opening or openings 80 are located and adapted to receive a tool to apply a force to move a slug in a direction towards the cutting edge 40. If two openings 80 are used, the openings may be axially and circumferentially offset in relation to one another. The opening or openings 80 provide a surface that the tool can engage for leverage to pry and cause a slug to move.

While the disclosed subject matter is illustrated and described as applying to a hole saw 20 constructed according to disclosed aspects, the disclosed subject matter may be altered for other types of cutting blades without changing the overall concept or operation of the disclosed subject matter. In addition, different combinations, spacing and order of teeth 42 in the set pattern of the cutting edge 40 could be employed without changing the overall concept or operation of what is contained in the disclosed subject matter, provided that there are inwardly extending ground set teeth with a progressively increasing inside set distances. While the cutting edge 40 of the hole saw 20 is illustrated as having a ground raker set, it will be appreciated that the cutting edge may incorporate all types of ground sets, such as without limitation a modified (or double set) raker, variable pitch modified (or D-double set) raker, wavy and alternate set, ETS.

Materials other than those described can be incorporated without changing the overall concept or operation of what is contained in the disclosed subject matter. It is contemplated that hole saw 20 may be made of any material that is suitable for cutting without changing the overall concept or operation of the disclosed subject matter. Incorporating harder materials is possible with the ground set process without compromising the material properties of the blade backer 44 and body of the hole saw 20. It is also contemplated that the cutting edge 40 with progressively increasing offset to one or both sides may be employed on blades other than for a hole saw 20.

Also, teeth 42 of the cutting edge 40 could be customized with different tooth rake angles, flank angles, bevel angles and heights without changing the overall concept or operation of what is contained in the disclosed subject matter. Moreover, different tip pitches and materials for the teeth 42 are contemplated without changing the overall concept or operation of what is contained in the disclosed subject matter. Structures of the teeth 42, other than those shown and described herein, are contemplated without changing the overall concept or operation of what is disclosed.

The disclosed subject matter has been described and illustrated with reference to at least one specific aspect. It is understood that this description and illustration is by way of example and not by way of limitation. Potential modifications and alterations will occur to others upon a reading and understanding of the disclosed subject matter, and it is understood that the disclosed and claimed subject matter includes all such modifications and alterations and equivalents.

While principles and modes of operation have been explained and illustrated with regard to particular embodiments, it must be understood, however, that this may be practiced otherwise than as specifically explained and illustrated without departing from its spirit or scope.

What is claimed is:

1. A hole saw comprising:
   a substantially cylindrical body containing a center axis of rotation, defined by an inner surface and an outer surface; and
   a plurality of ground set teeth defining a cutting edge, the plurality of teeth arranged in a pattern defining a first group of teeth oriented at angles toward the center axis of rotation, and a second group of teeth oriented at an angle away from the center axis of rotation;
   where the second group is intermixed with the first group,
   where the teeth angled away from the center axis of rotation are oriented at substantially the same angle; and
   where the teeth angled toward the center axis of rotation are oriented with each progressive tooth of the first group having an increasing angle relative to a prior tooth of the first group.

2. The hole saw of claim 1 further comprising a third group of straight symmetrically ground set teeth intermixed with the first group of teeth and second group of teeth.

3. The hole saw of claim 1 wherein the first group of teeth is asymmetrically ground.

4. The hole saw of claim 1 wherein the second group of teeth is asymmetrically ground.

5. The hole saw of claim 1 wherein each of the angles on the first group of teeth progressively increases from a previous angle by a factor in the range of 25% to 100% of the prior angle.

6. The hole saw of claim 1 further including at least one opening extending through the sides of the body, the at least one opening located and adapted to receive a device to force a cut slug in a direction towards the cutting edge.

7. A hole saw comprising:
   a substantially cylindrical body having a pair of sides extending substantially concentric to each other, the sides having an inner surface and an outer surface;
   a center axis of rotation;
   a cutting edge extending from an end of the body;
   a plurality of ground set teeth defining the cutting edge, the teeth arranged in a pattern of inwardly and outwardly extending teeth, where a first set of teeth extends inwardly toward the center axis of rotation at a progressively increasing inner distance; and
   a second set of teeth extending outwardly of the body away from the center axis of rotation, all of the teeth of the second set of teeth extending the same outer distance from the center axis of rotation, the teeth of the second set of teeth is intermixed with the first set of teeth.

8. The hole saw of claim 7 including a third set of straight teeth along the cutting edge that are encompassed between the pair of sides.

9. The hole saw of claim 7 wherein the first set of teeth are asymmetrically ground.

10. The hole saw of claim 7 wherein the second set of teeth are asymmetrically ground.

11. The hole saw of claim 8 wherein the third set of straight teeth are symmetrical ground.

12. The hole saw of claim 7 further including at least one opening extending through the sides of the body, the at least one opening located and adapted to receive a device to force a cut slug in a direction towards the cutting edge.

* * * * *